United States Patent [19]

Yoshida

[11] Patent Number: 4,498,050
[45] Date of Patent: Feb. 5, 1985

[54] DEMODULATION DEVICE FOR COMPOSITE PSK-PSK MODULATED WAVES

[75] Inventor: Yasuharu Yoshida, Tokyo, Japan

[73] Assignee: NEC Corporation, Tokyo, Japan

[21] Appl. No.: 491,487

[22] Filed: May 4, 1983

[30] Foreign Application Priority Data

May 7, 1982 [JP] Japan ................................ 57-75323

[51] Int. Cl.³ .......................... H03D 3/00; H03D 3/06
[52] U.S. Cl. .................................. 329/110; 329/112; 329/167; 375/82; 375/83
[58] Field of Search ............... 329/110, 112, 126, 137, 329/145, 167; 375/80, 82, 83, 85, 86, 87

[56] References Cited

U.S. PATENT DOCUMENTS 4,099,130  7/1978  Yoshida .......................... 329/112 X
4,255,713  3/1981  Yoshida .......................... 329/112 X
4,334,312  6/1982  Yoshida .......................... 329/112 X

FOREIGN PATENT DOCUMENTS 0133812  10/1979  Japan .
0142008  11/1979  Japan .

Primary Examiner—Eugene R. LaRoche
Assistant Examiner—D. C. Mis
Attorney, Agent, or Firm—Sughrue, Mion, Zinn, Macpeak & Seas

[57] ABSTRACT

A demodulator for a composite PSK-PSK modulated signal having a $2^n$-phase main data signal and a 2-phase subdata signal including a frame signal, said demodulator comprising an orthogonal detector 21 producing two orthogonally demodulated signals P, Q, a subdata reproducing section 50 for phase-shifting the orthogonal signals and multiplying together the phase-shifted signals to reproduce the subdata signal, a lock-in phase discriminator 42 for detecting the frame synchronization, and a main data reproducing section 51 for phase-shifting and switching the orthogonal signals in response to the phase discriminator and the reproduced subdata signal to reproduce the main signal.

4 Claims, 32 Drawing Figures

DEMODULATION DEVICE FOR COMPOSITE PSK-PSK MODULATED WAVES

BACKGROUND OF THE INVENTION

The present invention relates to a demodulating device which demodulates a composite PSK-PSK modulated wave subjected to a $2^n$(n being a positive integer)-phase PSK modulation by a main data signal and further subjected to a 2-phase PSK modulation by means of a subdata signal.

Recent developments in a digital transmission systems have been remarkable, and various types of practical circuits are already available in the market. The transmission systems have been modified for many requirements and a system which is applicable to general purposes as well as highly effective in operation is being investigated. One example of such a system has been proposed in the Japanese Patent Application Disclosure No. 142008/79 published on Nov. 5, 1979, whose applicants are NEC Corporation and Nippon Telegram and Telephone Public Corporation. This system, as set forth above, is a composite PSK-PSK modulation system which comprises a $2^n$-phase PSK modulated wave carrying a main data signal and a 2-phase PSK modulated wave carrying the subdata signal. According to this system, subdata signals can be effectively transmitted without affecting the bit error rate of the main data signals if the ratio of the data rate $f_2$ of the subdata signal against the data rate $f_1$ ($f_2 \leq f_1$) of the main data signal is set below a certain value. When the number of quantized phases of the main data signal is given as $2^n$(n=1, 2, ...) and the amount of phase shift $\alpha$ in the 2-phase PSK modulated wave of the subdata signal is given as $\alpha = \pi/2^n$, a demodulated subdata has the highest immunity to noise. The modulation output vector of the composite PSK-PSK modulated wave becomes identical with a $2^{n+1}$-phase PSK signal.

For phase detection of such a modulated wave, conventional delay detection or coherent detection may be employed. Coherent detection, however, entails a disadvantage such as described below. That is, whereas the main data signal component must be $2^n$-phase phase-detected, $2^{n+1}$-phase phase detection must be employed for the phase synchronizing circuit which recovers the reference carrier wave. As is well known, a $2^{n+1}$-phase synchronizing circuit is provided with a stably locked-in phase point at every $2\pi/2^{n+1}$ radians, including $2^n$ number of stable points of $2/2^{n+1}(2i+1)[i=0, 1, \ldots, 2^{n-1}]$ which are unnecessary for $2^n$-phase phase detection.

An example of conventional means for avoiding such an unnecessary phase locking-in has been disclosed by NEC Corporation in Japanese Patent Application Disclosure No. 133812/79 published Oct. 17, 1979. In the modulation systems of this device, the amount of phase shift by the subdata signal is selected as $\alpha < \pi/2^n$ and the vector arrangement of the modulated output is different from that of a $2^{n+1}$-phase PSK wave. The phase synchronizing circuit of the composite PSK-PSK modulation system comprises a phase detector for phase detecting an input signal, a first means for regenerating a subdata signal having the data rate of $f_2$, a second means for obtaining at least two orthogonal signals that are the outputs from the phase detector from which subdata signal components have been removed by using the reproduced subdata signal as a control signal, a third means for obtaining a phase error signal by $2^n$ frequency-multiplying the output of the second means, and a voltage controlled oscillator which is frequency-controlled by the output of the third means. According to this system, unneeded phase locking-in can be avoided; however, the amount of phase shift $\alpha$ for the subdata signal must be selected to be $\alpha < \pi/2^n$. This makes the conventional system defective in that the immunity of the subdata signal against noise is degraded from an optimum value by 20 log $$\left( \frac{\alpha}{\frac{\pi}{2^n}} \right)$$

dB.

SUMMARY OF THE INVENTION

It is therefore an object of the present invention to provide a demodulation device for composite PSK-PSK modulated waves, which overcomes the aforementioned disadvantages.

According to the present invention, there is provided a demodulating device for demodulating a composite PSK-PSK modulated wave comprising a $2^n$-phase (n being a positive integer) PSK modulated wave carrying a main signal and a 2-phase modulated wave carrying a subdata signal having a data rate slower than that of the main data signal, the subdata signal including a frame signal; comprising a phase synchronizing demodulator for providing two orthogonally demodulated signals in response to the composite PSK-PSK modulated wave; first means connected to said phase synchronizing demodulator for reproducing the subdata signal from the two orthogonally demodulated signals; second means for extracting the frame signal from the reproduced subdata signal and discriminating the phase locked state in the phase synchronizing demodulator in response to the reproduced subdata signal and the extracted frame signal; and third means connected to the phase synchronizing demodulator and the second means, for reproducing the main data from the two orthogonally demodulated signals in response to the control signal.

With the above structure, it is possible to select the amount of phase shift of the subdata signal to be $\pi/2^n$ radian as well as to obtain a correct main and subdata signals regardless of any phase locked-in states in the phase synchronizing demodulator.

BRIEF DESCRIPTION OF DRAWINGS

The present invention will now be described in more detail referring to the accompanying drawings:

FIGS. 3(a) through 3(e), 3(b'), 3(d') and 3(e') show the waveforms of the signals at various points of the demodulating device shown in FIG. 2;

FIGS. 8(a) through 8(j), 8(d'), 8(g'), 8(h'), 8(i') and 8(j') show the waveforms at various points of the device shown in FIG. 6.

DETAILED DESCRIPTION OF THE INVENTION

Figure 1:
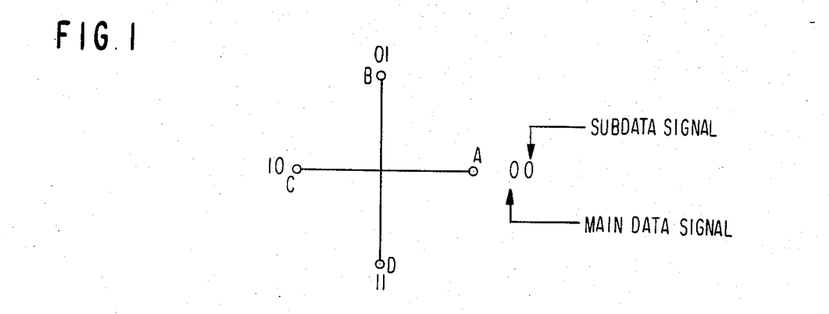
FIG. 1 is a vector diagram of a composite PSK-PSK modulated wave which comprises a 2-phase PSK wave of a main data signal and a 2-phase wave of a subdata signal.

FIG. 1 shows the vector diagram of a modulated wave to be subjected to demodulation by the demodulating device for 2-phase PSK/2-phase PSK modulated waves and shows the correspondence of the main and the subdata signals with the modulated vector. Each of the main and the subdata signals is carried with a 2-phase PSK modulated wave.

Figure 2:
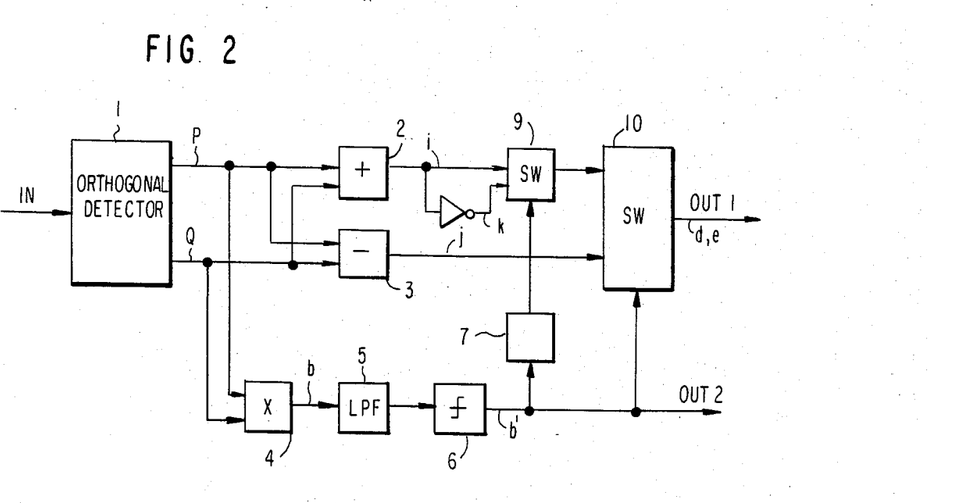
FIG. 2 is a block diagram of one embodiment according to the present invention showing the structure of a 2-phase PSK/2-phase PSK wave demodulating device.

In FIG. 2, a demodulating device for 2-phase PSK/2-phase PSK modulated waves comprises an orthogonal detector or phase synchronizing demodulator 1, an adder 2, a subtractor 3, a multiplier 4, a low pass filter 5 (hereinunder referred to as LPF), a level decision circuit 6, a locked-in phase discriminating device 7, an inverter 8, and analog switches 9 and 10. The operation of the demodulating device will be described referring to FIGS. 1, 3(a) to 3(e), 3(d'), 3(b') and 3(e').

Figures 3, 3A, 3B, 3C, 3D, 3E:
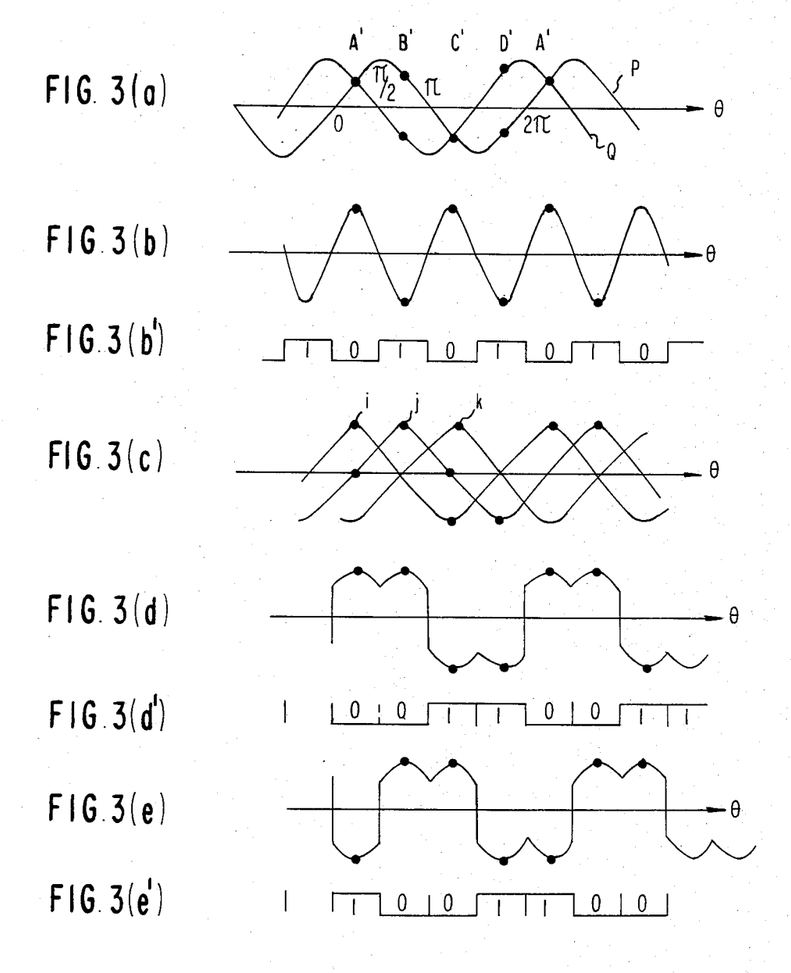

The modulated input wave as shown in FIG. 1 is supplied to the detector 1 which provides orthogonally demodulated signals P and Q as shown in FIG. 3(a). The signals P and Q are multiplied by 2 by the multiplier 4 to become a subdata signal (analog signal) as shown in FIG. 3(b). What is meant by phase multiplication is that the signals P and Q are time dependent phases. Proper multiplication of these signals produces a signal having a phase time dependence which is a multiple of the original time dependence. Thus phase multiplication resembles frequency multiplication. The output from the multiplier 4 is supplied to the level decision circuit 6 via the LPF 5 which eliminates out of band noises, and becomes a subdata signal (a binary digital signal) as shown in FIG. 3(b'). In this case the positive level denotes the level 0 while the negatives denote the level 1.

As for the main data signal, the signals P and Q are supplied to the adder 2 and the subtractor 3 which subject the signals to phase shift, and appear at the outputs of the adder 2 and the subtractor 3, respectively, as signals i and j as shown in FIG. 3(c). Supposing that an output i from the adder 2 is being selected at the analog switch 9, the input of the analog switch 10 is given by the outputs from the adder 2 and the subtractor 3. As the analog switch 10 is controlled by the output from the level detection circuit 6, the main data signal as shown in FIG. 3(d) is regenerated at the analog switch 10. In case the signal of FIG. 3(d) is discriminated at the level 0, it becomes a digital signal as shown in FIG. 3(d') (in this case, the positives denote 0 and the negatives denote the level 1.)

Figure 4:
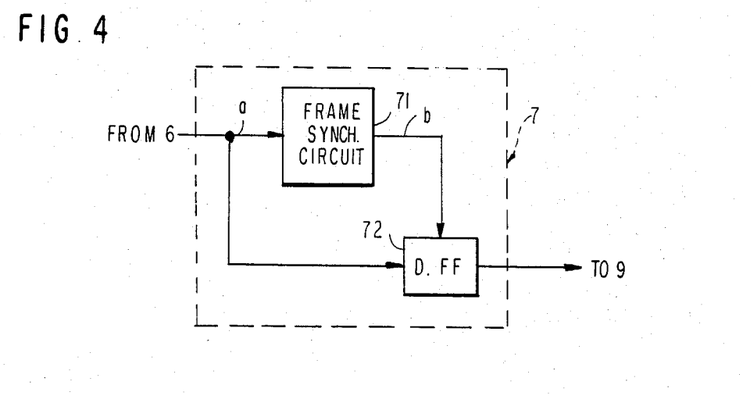
FIG. 4 is a block diagram of one embodiment of the locked-in phase discriminating means used in the present invention.

The operation explained in the foregoing refers to the case where the modulated wave A of FIG. 1 is demodulated at the phase point A' of the signals P, Q shown in FIG. 3(a) in the phase synchronizing demodulator 1 of FIG. 2. As is evident from the comparison of the main and the subdata signals of FIG. 1 with the main and subdata signals of FIGS. 3(d') and 3(d'), the signals (0, 0) in FIG. 1 are identical with the signals (0, 0) in FIGS. 3(d') and 3(b'). However, the phase synchronizing demodulator 1 of FIG. 2 has a phase ambiguity that it demodulates the modulated wave A of FIG. 1 at the points A', B', C' and D' as shown in FIG. 3(a). As a consequence, if the modulated wave is demodulated at the points B' and D', there arises an inconvenience that the main data signal is dependent on the subdata signal; this is evident from FIGS. 3(b') and 3(d'). The subdata and the main data signals must essentially be independent of each other. In order to obviate the above inconvenience, the analog switch 9 and the locked-in phase discriminating device 7 are provided. In the above mentioned case, an output (as shown by the symbol k in FIG. 3(c)) of the inverter 8, which has a reverse polarity of the output i of the adder 2, is selected by the analog switch 9 and a main data signal of FIG. 3(e) is provided as the output of the analog switch 10. Supposing that the signal of FIG. 3(e) is discriminated at the level 0, deciding the positives to be 0 and the negatives to be 1, the signal becomes a binary digital signal as shown in FIG. 3(e'). By thus operating the device, correct main data and the subdata signals as shown in FIGS. 3(e') and (b') can be obtained even if the modulated wave A of FIG. 1 is demodulated at the phase point B' or D' of FIG. 3(a). The control signal for the analog switch 9 can be obtained from the locked-in phase discriminating device which comprises a frame synchronizing circuit 71 (for example, see U.S. Pat. Nos. 3,978,285 and 4,285,062), and a D-type flip-flop 72 as shown in FIG. 4. The operation of the device 7 will be described below.

Figures 5A, 5B, 5C:
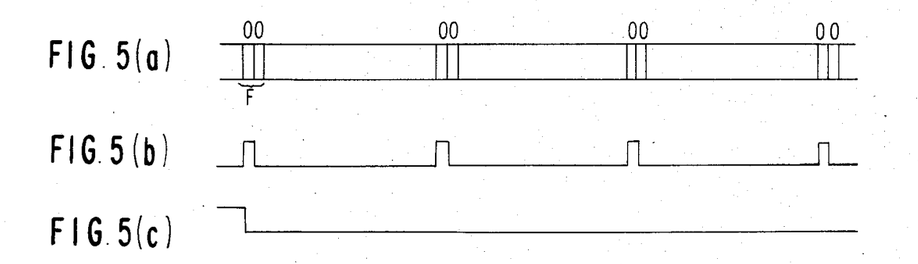
FIGS. 5(a) to 5(c) are time charts explaining the operation of FIG. 4.

Normally, a digital data signal includes a frame pulse which determines the position for inserting and extracting accessory bits such as scrambling, stuffing bits, parity bits, etc. Suppose now that the subdata signal includes a frame pulse F which comprises a "0" pulse continuing for 2 bits as shown in FIG. 5(a). In this case, it becomes possible to establish a frame synchronization by detecting the "0" pulse of 2 consecutive bits in the frame synchronizing circuit 71, which provide the detecting pulse as shown in FIG. 5(b). Therefore, the D type flip-flop 72, responsive to the signals as shown in FIGS. 5(a) and (b), provides a signal which stays continuously at the level 0 as shown in FIG. 5(c). When the modulated wave A of FIG. 1 is demodulated at the point A' or C' of FIG. 3(a), the output of the D type flip-flop 72 becomes a signal which continues at the level 0, as mentioned above. However, when it is demodulated at the point B' or D', the output of the D type flip-flop 72, i.e. the output of the device 7, becomes a signal which continues at the level 1. This is evident from the signal shown in FIG. 3(b'). Consequently, the output signal of the device 7 can be used as a control signal for the analog switch 9.

It should be noted that by inserting a discriminating means such as the level decision circuit 6 into the outputs of the adder 2 and the subtractor 3 in FIG. 2, the analog switches 9 and 10 can respectively be replaced by a digital gate. It is also noted that the frame pulse is not limited to a pulse which continues for 2 bits. Furthermore, PN pulses may be used for the frame pulses.

Figure 6:
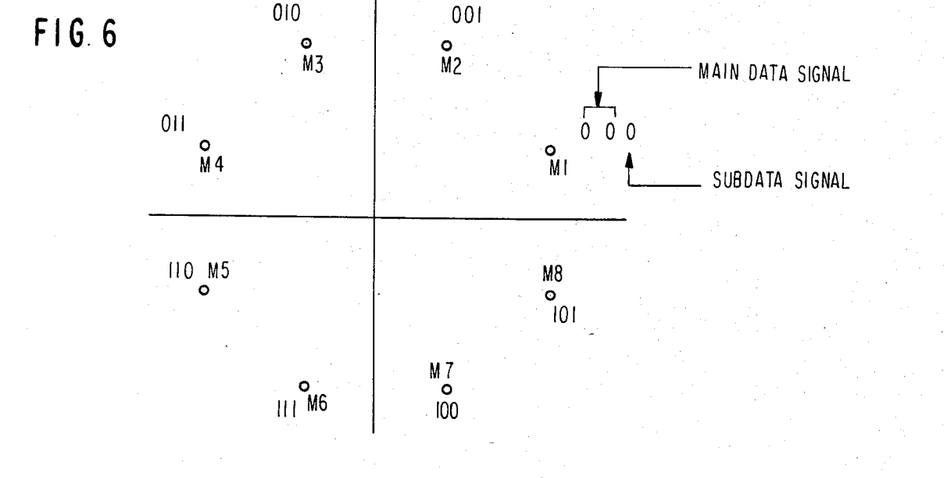
FIGS. 6(a) through 6(c) are vector diagrams of composite PSK-PSK modulated waves which comprise a 4-phase PSK wave carrying the main data signal and a 2-phase PSK wave carrying the subdata signal.
Figure 7:
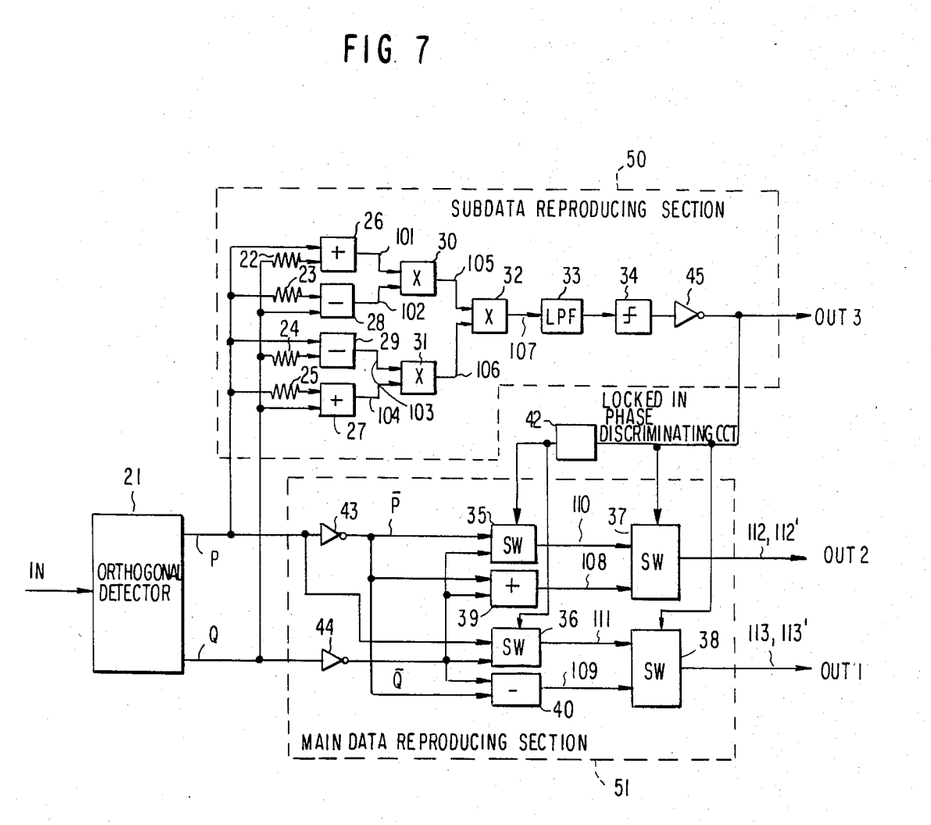
FIG. 7 shows one embodiment of a demodulating device for 4-phase PSK/2-phase PSK waves according to the present invention.

FIG. 6 shows the positional relation of the modulated signals comprising a 4-phase PSK wave of the main data signal and a 2-phase PSK modulated signal of the subdata signal. FIG. 7 shows an embodiment according to the present invention for the modulated signals of FIG. 6, wherein the reference numeral 21 denotes an orthogonal detector; 22 through 25, resistors; 26, 27 and 39, adders; 28, 29 and 40, subtractors; 30 through 32, multipliers; 33, a low-pass noise filter; 34, a level decision circuit; 35 through 38, analog switches; 43 through 45, inverters 42, a locked-in phase discriminating circuit; 101 through 113 and 112' through 113', output signals from respective sections. FIGS. 8(a) through 8(j), 8(d'), 8(g'), 8(h'), 8(i') and 8(j') respectively show the waveforms at various points of FIG. 7. The abscissa $\theta$ represents the phase relationship of the input modulated wave with the reference carrier wave.

The operation of the demodulator shown in FIG. 7 will now be explained referring to FIGS. 6 and 8.

Figure 8A:
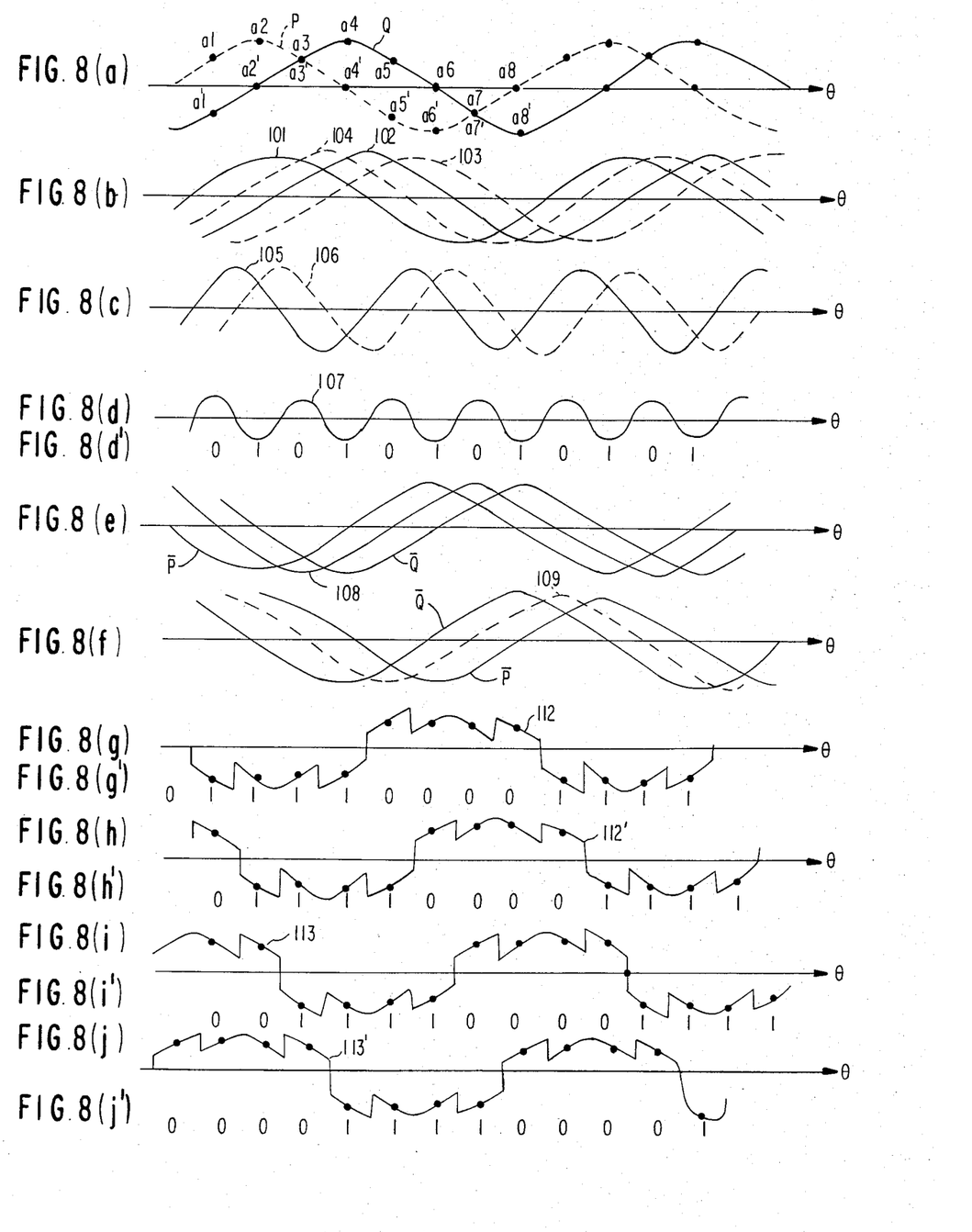

In FIG. 7, a 4-phase PSK/2-phase PSK modulated wave is orthogonally detected and converted into two signals P and Q of FIG. 8(a) by the detector 21. These signal P and Q are supplied to the subdata reproducing section 50 and the main data signal reproducing section 51. In the subdata reproducing section 50, the signals P and Q are supplied to a phase shifter which comprises the resistors 22 through 25, the subtractors 26 and 27, and the adders 28 and 29, where they are converted into output signals 101 through 104 which are in the phase relation as shown in FIG. 8(b) and Table 1.

TABLE 1

| Output Signal | P | 101 | 102 | 103 | 104 |
|---|---|---|---|---|---|
| Phase Relation | 0 | $\pi/8$ radian delay | $5\pi/8$ radian delay | $7\pi/8$ radian delay | $3\pi/8$ radian delay |

The signals 101 and 102 are supplied to the multiplier 30 to be multiplied and become the signal 105 as shown in FIG. 8(c). Further, the signals 103 and 104 are multiplied by the multiplier 31 to become the signal 106. The signals 105 and 106 are multiplied by the multiplier 32 to become the signal 107 as shown in FIG. 8(d). The signal 107 is the input signal multiplied by 4 in phase which comprises the subdata signal alone. Discrimination by means of the discriminating means 34 via the filter 33 and inverter 45 provides the subdata signal (OUT 3) shown in FIG. 8(d').

The data reproducing section 51 will now be explained. The signals P and Q are converted to the output signals 108 through 110 as shown in FIG. 8(e) via the inverters 43, 44, the adder 39, and the subtractor 40. The analog switches 35 and 36 select the signals P, $\bar{P}$ and $\bar{Q}$ in response to the output from the locked-in phase discriminating circuit 42 and provide the signals 110 and 111. In other words, when the output from the discriminating circuit 42 is at the state "0", the signals 110 and 111 become the signal $\bar{P}$ and $\bar{Q}$, respectively, as shown in FIG. 8(e). As is evident from FIGS. 8(e) and (f), the signals 108 and 109 are delayed from the signals $\bar{P}$ and $\bar{Q}$ by $\pi/4$ radian. The signals 110 and 108 are supplied to the switch 37 where the signal 110 is selected when the subdata signal, i.e. OUT 3 is "0" and the signal 108 is selected when the same is "1" to become the output signal 12 as shown in FIG. 8(g). Similarly the signals 111 and 109 are supplied to the switch 38 where the signal 111 is selected when the subdata signal, i.e. OUT 3 is "0" and the signal 109 is selected when the same is "1" to become an output signal as shown in FIG. 8(i). When the modulated wave shown in FIG. 6 is supplied to the orthogonal detector 21 the demodulated signal has the values $a_1$ through $a_8$ and $a_{1'}$, through $a_{8'}$, as shown in FIG. 8(a).

Supposing that the modulated signal M1 shown in FIG. 6 is demodulated by the device shown in FIG. 7, it assumes any one of the values $a_1$ through $a_8$ and $a_{1'}$, through $a_{8'}$, shown in FIG. 8 depending on the phase ambiguity of the reference carrier wave. At the values $a_2(a_{2'})$, $a_4(a_{4'})$, $a_6(a_{6'})$ and $a_8(a_{8'})$, the subdata signal becomes "1" unlike the transmitting signal. In the case the subdata signal OUT 3 shifts from 0 to 1 at the transmitting side at the demodulated state (that is, the shift is from 1 to 0 at the receiving side or demodulating side), signals which should be independent of the data of the signal OUT 3 are influenced and changed by the signal OUT 3, whereby the demodulation becomes incorrect. This is apparent from the data signals OUT 1, shown in FIGS. 8(i) and 8(j) and OUT 2 shown in FIGS. 8(g) and 8(h). In order to obviate this inconvenience, the circuit shown in FIG. 7 is provided with the locked-in phase decision circuit 42 and the analog switches 35 and 36. The circuit 42 is of the structure identical with the circuit shown in FIG. 4, and it decides whether the subdata signal coincides with the transmitting signal or not. When the signal is correctly reproduced, it becomes "0"; when inversed, it becomes "1". When the output from the circuit 42 becomes "1", the switch 35 generates the signal $\bar{Q}$ and the switch 36 the signal P. As a result, the signals OUT 2, 3 will assume the waveforms 112', 113' as shown in FIGS. 8(h) and 8(j') respectively, and the discriminated signals becomes such signals as shown in FIGS. 8(h') and 8(j'). Here, the signals of FIGS. 8(h') and 8(j') are not affected by the shift from 1 to 0 at the receiving end due to demodulation but are correctly demodulated even if the subdata signal at the transmitting end is shifted from 0 to 1.

Thus, the embodiment shown in FIG. 7 is capable of reproducing correct main signals at all times without being affected by the phase ambiguity of the reference carrier wave.

Figure 9:
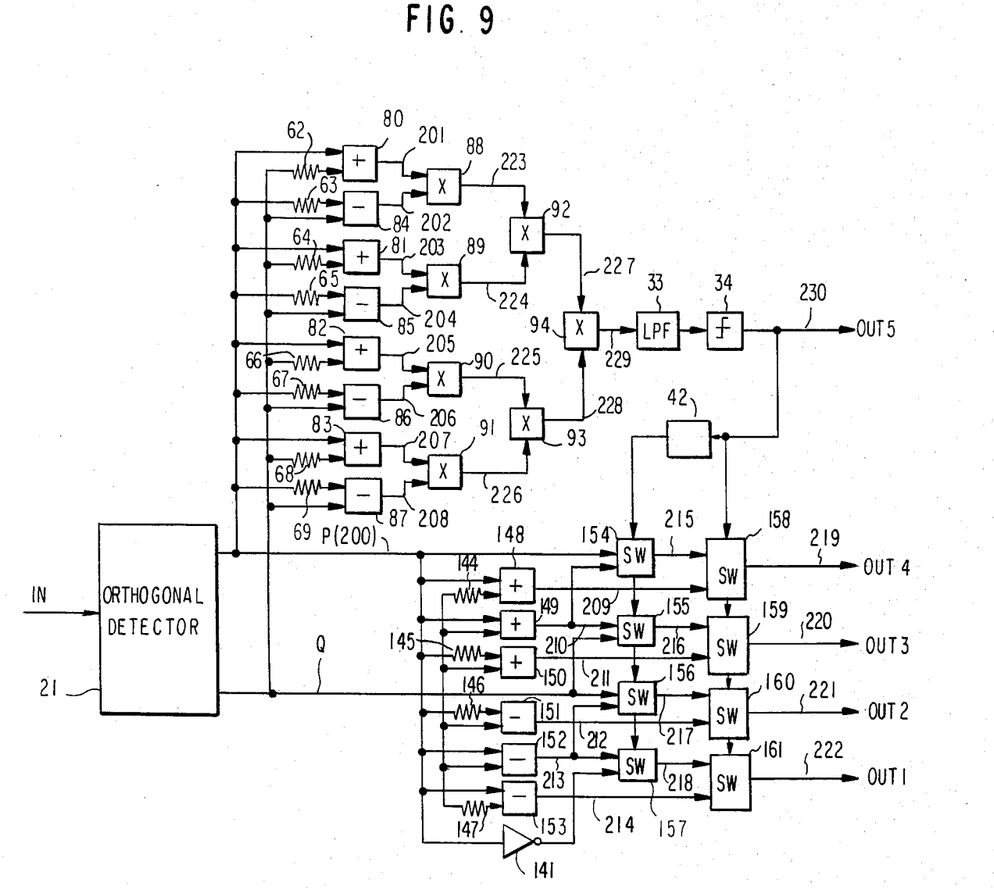
FIG. 9 is an embodiment of a demodulating device for an 8-phase PSK/2-phase PSK wave of the present invention.

FIG. 9 shows another embodiment of the present invention demodulating device wherein the main data signal is carried with an 8-phase PSK wave and the subdata signal is carried by a 2-phase PSK wave. In FIG. 9, the reference numerals 62 through 69 and 144 through 147 denote resistors; 80 through 83 and 148 through 150, adders; 84 through 87 and 151 through 153, subtractors; 88 through 94 multipliers; amd 154 through 161, analog switches. The circuits 21, 33, 34 and 42 of FIG. 9 are identical with those shown in FIG. 7.

The subdata reproducing section is first described. The 8-phase PSK/2-phase PSK wave is demodulated by the detector 21 to provide the signals P and Q. These signals P and Q are supplied to a phase-shifter which comprises the resistors 62 through 69, the adders 80 through 83 and the subtractors 84 through 87 to thereby obtain output signals 201 through 208 having the phase relation as shown in Table 2.

TABLE 2

| Output Signal | Phase Relation |
|---|---|
| 200 (P) | 0 |
| 201 | $\pi/16$ radian delay |
| 202 | $9\pi/16$ radian delay |
| 203 | $3\pi/16$ radian delay |
| 204 | $11\pi/16$ radian delay |
| 205 | $5\pi/16$ radian delay |
| 206 | $13\pi/16$ raidan delay |
| 207 | $7\pi/16$ radian delay |

TABLE 2-continued

| Output Signal | Phase Relation |
|---|---|
| 208 | 15 $\pi$/16 radian delay |

The signals 201 and 202, the signals 203 and 204, the signals 205 and 206 and the signals 207 and 208 are respectively multiplied by the multipliers 88 through 91 to become the signals 223 through 226. The signals 223 and 224, the signals 225 and 226 are multiplied respectively by the subsequent multipliers 92 and 93 to become the signals 227 and 228. These signals are multiplied by the multiplier 94 to become the output 229. The signal 229 is therefore the input signal multiplied in phase by 8, and is the subdata signal. Thus, by discriminating it by means of the level discriminating device 34 via the LPF 33, the subdata signal 230 (OUT 5) can be obtained.

The main data reproducing section will now be described.

The demodulated signals P and Q are supplied to a phase-shifter which comprises the resistors 144 through 147, the adders 148 through 150, and the subtractors 151 through 153 to be converted into the signals 209 through 214 which have the phase relation as shown in Table 3.

TABLE 3

| Output Signal | Phase Relation |
|---|---|
| 200 (P) | 0 |
| 209 | $\pi$/8 radian delay |
| 210 | 2 $\pi$/8 radian delay |
| 211 | 3 $\pi$/8 radian delay |
| 212 | 5 $\pi$/8 radian delay |
| 213 | 6 $\pi$/8 radian delay |
| 124 | 7 $\pi$/8 radian delay |

The output signals 210, 213, P, Q and $\overline{Q}$ are supplied to the analog switches 154 through 157 and selected in accordance with Table 4 by the output from the phase discriminating circuit 42. The output from the phase discriminating circuit 42 is given as "0" when the subdata signal is reproduced coinciding with the transmitting signal and as "1" when it is inversed.

TABLE 4

| Signal | 215 | | 216 | | 217 | | 218 | | 219 | | 220 | | 221 | | 222 | |
|---|---|---|---|---|---|---|---|---|---|---|---|---|---|---|---|---|
| Output 42 | 0 | 1 | 0 | 1 | 0 | 1 | 0 | 1 | — | — | — | — | — | — | — | — |
| Output 230 | — | — | — | — | — | — | — | — | 0 | 1 | 0 | 1 | 0 | 1 | 0 | 1 |
| Selected signal | P | 210 | 210 | Q | Q | 213 | 213 | $\overline{P}$ | 215 | 209 | 216 | 211 | 217 | 212 | 218 | 214 |

Subsequently, the signals 215 through 218, 209, 211, 212 and 214 are transmitted to the switches 158 through 161 and are selected as shown in Table 4 depending on the state of the subdata output signal 230 (OUT 5).

The signals 219 through 222 (OUT 1 through 4) as obtained by the operation described above become the correct main signals at all times without being affected by the phase ambiguity of the reference carrier wave.

The present invention thus enables selection of the most effective value, $\alpha = \pi/2^n$ for the amount of phase shift of the subdata signal. At the same time, it is also capable of reproducing correct main and subdata signals even if the locked-in phase is in an undesired state which is likely to occur in the phase synchronizing demodulator.

What is claimed is:

1. A demodulating device for demodulating a composite PSK-PSK modulated wave comprising a $2^n$-phase (n being a positive integer) PSK modulated wave carrying a main signal and a 2-phase modulated wave carrying a subdata signal having a data rate no faster than that of said main data signal, said subdata signal including a frame signal, comprising:
   a phase synchronizing demodulator for providing two orthogonally demodulated signals in response to said composite PSK-PSK modulated wave;
   first means connected to said phase synchronizing demodulator for reproducing said subdata signal from said two orthogonally demodulated signals;
   second means for extracting said frame signal from the reproduced subdata signal and discriminating the phase locked state in said phase synchronizing demodulator in response to said reproduced subdata signal and the extracted frame signal; and
   third means connected to said phase synchronizing demodulator and said second means for reproducing said main data from said two orthogonally demodulated signals in response to said frame signal and said reproduced subdata signal.

2. A demodulating device, as recited in claim 1, wherein said first means comprises $2^{n-1}$ phase shifters (26–29) and multiplying means (30–32) for multiplying together the outputs of said phase shifters and said two orthogonally demodulated signals.

3. A demodulating device, as recited in claim 2, wherein said phase shifters comprise arithmetic means (2, 3) for summing and differencing weighted values of said two orthogonally demodulated signals.

4. A demodulating device, as recited in claim 1, wherein said third means comprises:
   phase shifters (39, 40, 43, 44);
   one or more first switches (35, 36) controlled by the output of said discriminating means (42) for switching the outputs of said phase shifters; and
   one or more second switches (37, 38) controlled by said reproduced subdata signal (OUT 3) for switching the outputs of said first switches.

* * * * *

UNITED STATES PATENT AND TRADEMARK OFFICE
CERTIFICATE OF CORRECTION

PATENT NO. : 4,498,050
DATED : February 5, 1985
INVENTOR(S) : Yasuharu Yoshida

It is certified that error appears in the above-identified patent and that said Letters Patent is hereby corrected as shown below:

Column 3, line 32 "3(d'), 3(b')" should be --3(b'), 3(d')--;

line 46, "noises" should be --noise--.

Column 4, line 3, "3(d') (second occurrence) should be --3(b').

Column 5, line 19, "signal" should be --signals--.

Column 6, line 48, "amd" should be --and--.

Column 7, line 35, (TABLE 3) "124" should be --214--.

Signed and Sealed this

Fourteenth Day of January 1986

[SEAL]

Attest:

DONALD J. QUIGG

Attesting Officer

Commissioner of Patents and Trademarks